(12) United States Patent
Sawicki

(10) Patent No.: US 11,203,474 B2
(45) Date of Patent: Dec. 21, 2021

(54) REVERSIBLE FABRIC GIFT WRAP

(71) Applicant: Sue Sawicki, Phoenix, AZ (US)

(72) Inventor: Sue Sawicki, Phoenix, AZ (US)

( * ) Notice: Subject to any disclaimer, the term of this patent is extended or adjusted under 35 U.S.C. 154(b) by 0 days.

(21) Appl. No.: 16/705,430

(22) Filed: Dec. 6, 2019

(65) Prior Publication Data

US 2021/0171258 A1 Jun. 10, 2021

(51) Int. Cl.
*B65D 65/22* (2006.01)
*B65D 65/10* (2006.01)

(52) U.S. Cl.
CPC .............. *B65D 65/22* (2013.01); *B65D 65/10* (2013.01)

(58) Field of Classification Search
CPC ................................. B65D 65/22; B65D 65/10
USPC ....................................................... 229/87.07
See application file for complete search history.

(56) References Cited

U.S. PATENT DOCUMENTS

| | | | | |
|---|---|---|---|---|
| 791,677 | A * | 6/1905 | Dowling | B65D 85/36 206/525 |
| 2,711,234 | A * | 6/1955 | Rubens | A45C 13/002 190/26 |
| 3,276,671 | A * | 10/1966 | Fleitman | B65D 65/22 206/521 |
| 3,322,176 | A * | 5/1967 | Geller | B65D 29/04 383/6 |
| 3,381,889 | A * | 5/1968 | Laskow | B65D 75/14 229/87.19 |
| 4,566,592 | A * | 1/1986 | Klukos | B65D 75/20 206/215 |
| 4,726,509 | A * | 2/1988 | Fonas | B65D 5/4262 206/457 |
| 4,777,066 | A * | 10/1988 | White | B65D 33/28 156/70 |
| 5,004,144 | A | 4/1991 | Selga | |
| 5,392,983 | A | 2/1995 | Clarke-Bolling et al. | |
| 5,529,395 | A | 6/1996 | French | |
| 7,077,308 | B2 | 7/2006 | Beach | |
| D699,150 | S * | 2/2014 | Amidon | D11/184 |
| 8,783,546 | B2 * | 7/2014 | Uyehara | B65D 65/06 229/87.19 |
| 8,864,013 | B2 * | 10/2014 | Franco | B65B 11/004 229/103.2 |
| 8,931,242 | B1 * | 1/2015 | Sardo | B65D 33/1625 53/417 |
| 9,174,783 | B1 | 11/2015 | Grabell et al. | |
| 9,365,337 | B2 * | 6/2016 | Fullan | B65D 65/06 |
| D837,065 | S * | 1/2019 | Baez | D9/702 |
| 2012/0012646 | A1 * | 1/2012 | Bissonnette | B65D 65/22 229/87.19 |
| 2017/0305621 | A1 * | 10/2017 | Miller | B65D 83/0841 |

* cited by examiner

*Primary Examiner* — Peter N Helvey
(74) *Attorney, Agent, or Firm* — Lisa Foundation Patent Clinic at Arizona University

(57) ABSTRACT

A reusable article for wrapping gifts comprised of reversible fabric sheet having a fabric sizing strip and an elastic loop so that the reusable article requires no additional materials to wrap the gift, such as fastening or adhesive means. The reusable article for wrapping gifts is made to accommodate a variety of gift shapes and sizes. The reusable article may further be comprised of contrasting colors or patterns so that the single article comprises multiple giftwrap design configurations.

9 Claims, 5 Drawing Sheets

REVERSIBLE FABRIC GIFT WRAP

BACKGROUND

1. Field of the Invention

The present disclosure relates generally to flexible and reusable fabric gift wrappings, and more particularly to gift wrappings in which wrappings are complete in and of themselves, requiring no additional materials for fastening. Such devices accommodate a variety of gift sizes and shapes in an aesthetically appealing manner.

2. Description of Related Art

For many years a traditional aspect of gift-giving includes wrapping the gifts in wrapping paper. The wrapping paper serves as an aesthetically pleasing decoration for the gift as well as a means for temporarily concealing the contents of the gift from the recipient.

Traditionally, gift wrapping involves several steps and materials. Wrapping requires separately purchasing paper, bows, ribbons, and tape. The paper must be cut to the appropriate size and used to wrap the gift by securing with tape and then adhering bows and ribbons. Once the gift is opened, the wrap is typically disposed of after only one use. Disposable gift wrapping can be expensive, environmentally unfriendly, and time consuming to wrap.

Another environmental issue related to traditional gift wrapping involved the practice of first placing the gift in cardboard or some other semi-rigid paper box. The gift box establishes a common geometric shape which is more easily wrapped with traditional wrapping paper. Many gifts have irregular shapes, making them difficult to cover in wrapping paper without using additional cardboard or semi-rigid paper boxes. The gift box itself is also frequently discarded after single use, contributing to excessive consumption and waste disposal problems.

One solution to the waste problems associated with paper wrapping paper is to use a gift sack. A gift sack is typically a bag made of cloth or paper, used to contain and conceal the gift. A disadvantage of paper gift sacks is that they are typically discarded after single use. Another disadvantage is that the sack is typically sized to receive gifts of a limited range of sizes. Further, some gift sacks have non-closeable openings which require additional decorative papers to be placed into the gift sack to conceal the gift.

So as to reduce the complexity and length of the Detailed Specification, and to fully establish the state of the art in certain areas of technology, Applicant(s) herein expressly incorporate(s) by reference all of the following materials identified in each numbered paragraph below.

U.S. Pat. No. 9,174,783 of Wrapeez describes a reusable gift wrap assembly including two sleeves configured to cover a box. The sleeves include a closed end and an open end, the open ends overlapping each other to fit the box and gather to form a ribbon-like surface.

U.S. Pat. No. 5,392,983 of It's A Wrap! describes a reusable fabric giftwrapping requiring no additional materials. It is a washable fabric sheet secured through a resealable vinyl acetate polymer adhesive coating.

U.S. Pat. No. 7,077,308 of Beach describes a reusable gift wrap made of stretch fabric, two sleeves and a ribbon trim. The ribbon trim is sewn onto the outer sleeve and wrapped around the box to secure to the fabric.

U.S. Pat. No. 5,529,395 of French describes a reusable gift wrap comprising a body that can conform to fit the size of the gift. The giftwrap is secured with a self-forming bow around a drawstring closure.

U.S. Pat. No. 5,904,289 of Hagan describes a reusable gift wrap forming a unitary fabric sheet with fastening means attached to the outer surface and inner surfaces of the fabric sheet. The preferred fastening means may be releasable flexible hook and loop type fasteners.

Applicant(s) believe(s) that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), Applicant(s) will amend the specification to expressly recite the essential material that is incorporated by reference as allowed by the applicable rules.

SUMMARY

The present invention provides among other things a reusable fabric gift wrap. The use of such a reusable fabric gift wrap eliminates the dependence on disposable objects for the production of gift wrapping, and thus gets rid of the environmental waste problems associated with traditional paper gift wrapping.

The present invention also provides a long-lasting alternative to traditional paper gift wrap. The fabric wrap withstands repeated wrappings and thus reduces the replacement costs associated with traditional wrapping paper. Further, the fabric wrap is complete within itself and does not require additional materials for wrapping. This improves the ease of use of this reusable fabric gift wrap, and further reduces the replacement costs associated with traditional materials for wrapping such as adhesive, ribbons, and bows.

Another aspect of the present invention is to provide reusable fabric gift wrap that can accommodate various gift sizes and shapes. In accordance with this aspect of the invention, a fabric sizing strip is coupled to the fabric sheet. In a preferred embodiment, the elastic loop is fed through the fabric sizing strip so that it may be movable with respect to the fabric sheet in order to accommodate the current gift size. The fabric sizing strip provides an advantage over traditional fabric gift wraps by eliminating the strict sizing constraints resulting in limitations on gift shape and size.

An additional significant aspect of the present invention is to provide a reusable fabric gift wrap that is extremely simple in design and use. The present invention requires only a single sheet of wrapping material and can be used to wrap a gift quickly and easily without any special training. The reusable fabric gift wrapping is complete in itself, requiring no additional materials, such as separate fastening means.

The reusable fabric gift wrap can be formed of any suitable fabric material including, but not limited to, cotton, silk, polyester, and rayon. Silk is the preferred wrapping material due to its aesthetical qualities, availability, and light weight. The fabric sheet may be formed of a single fabric sheet, or a plurality of sheets for purposes of package protection and reversibility. The two sides of the fabric sheet may be contrasting in color or pattern to further provide for reversibility. The fabric wrap may be printed with designs for certain gift-giving situations or with generic patterns suitable for many occasions and recipient types.

In a preferred embodiment, the peripheral edge is configured to be pulled up around the gift package and the elastic loop is configured to expand in response to the peripheral edge of the fabric sheet being fed therethrough. The peripheral edge of the fabric sheet is folded down around the elastic loop to form a pinwheel shaped bow at the top of the gift. The pinwheel shaped bow can comprise the contrasting pattern or color of the second side of the fabric sheet for decorative purposes. The pinwheel shaped bow can also comprise the pattern or color of the first side of the fabric sheet so that the gift is wrapped in a singular color or pattern.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographers, to use only the plain and ordinary meaning of terms in the specification and claims unless he clearly states otherwise and then further, expressly sets forth the "special" definition of that term and explains how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of 35 U.S.C. § 112(f). Moreover, even if the provisions of 35 U.S.C. § 112(f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DETAILED DESCRIPTION and DRAWINGS, and from the CLAIMS.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

Elements and acts in the figures are illustrated for simplicity and have not necessarily been rendered according to any particular sequence or embodiment.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

For the foregoing reasons, there is a need, therefore, for a one piece reusable gift wrap, that does not have to exactly match the size of the gift, that can be applied without the use of adhesive or tape, that is simple to use and gives the wrapped package a neat appearance.

Figure 1:
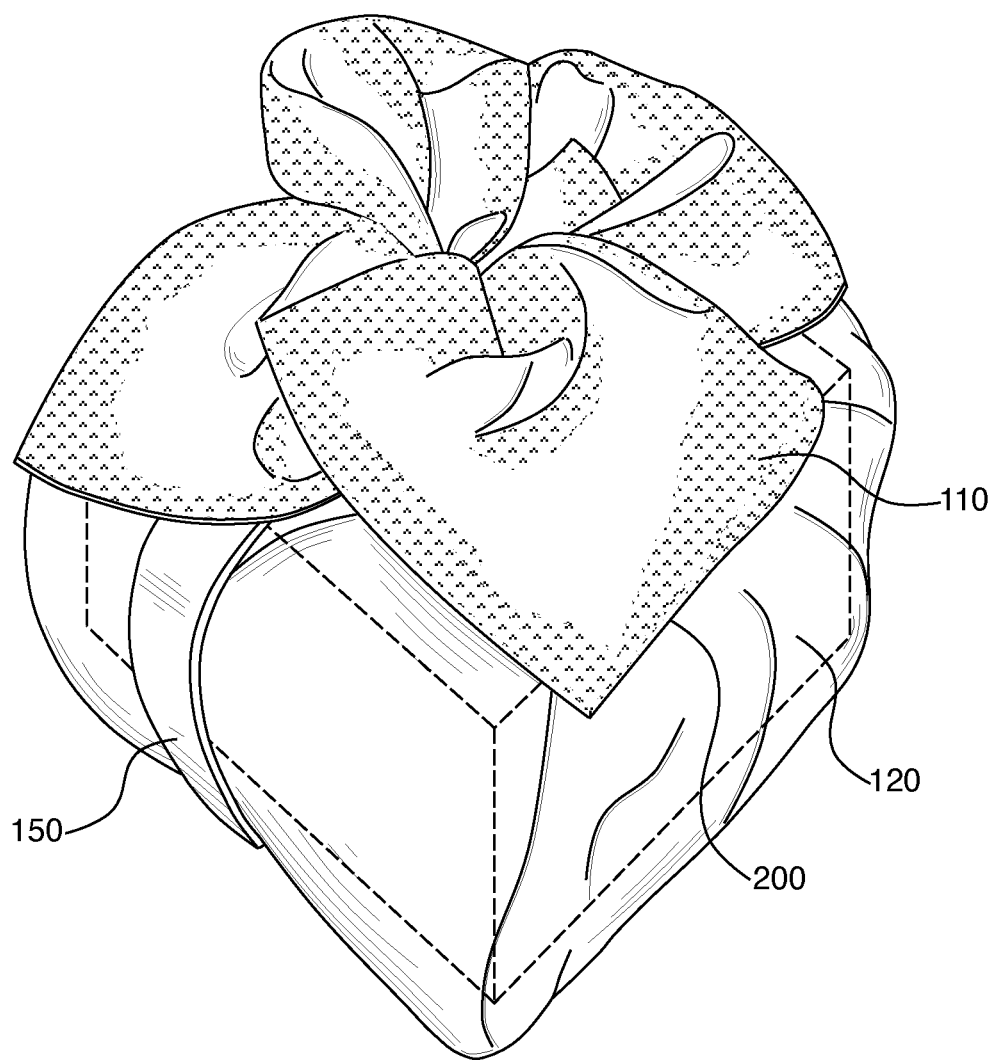
FIG. 1 depicts a perspective view of the gift wrap as completely secured around a square shaped gift.

FIG. 1 illustrates a perspective view of a reusable fabric gift wrap according to one exemplary embodiment of the invention. The reusable fabric gift wrap generally includes a fabric sheet 100 with a first side 110 and second side 120. The fabric sheet further comprises a peripheral edge 200 extending around the perimeter of the fabric sheet. The peripheral edge 200 couples the first side 110 and second side 120. In the preferred embodiment, the two sides of the fabric sheet are coupled through stitching. In other embodiments, they can be coupled through adhesive, hook and loop fasteners, and other fastening means. In other embodiments, the fabric sheet 100 comprises a single fabric sheet comprised of two sides of the same sheet.

Figure 2:
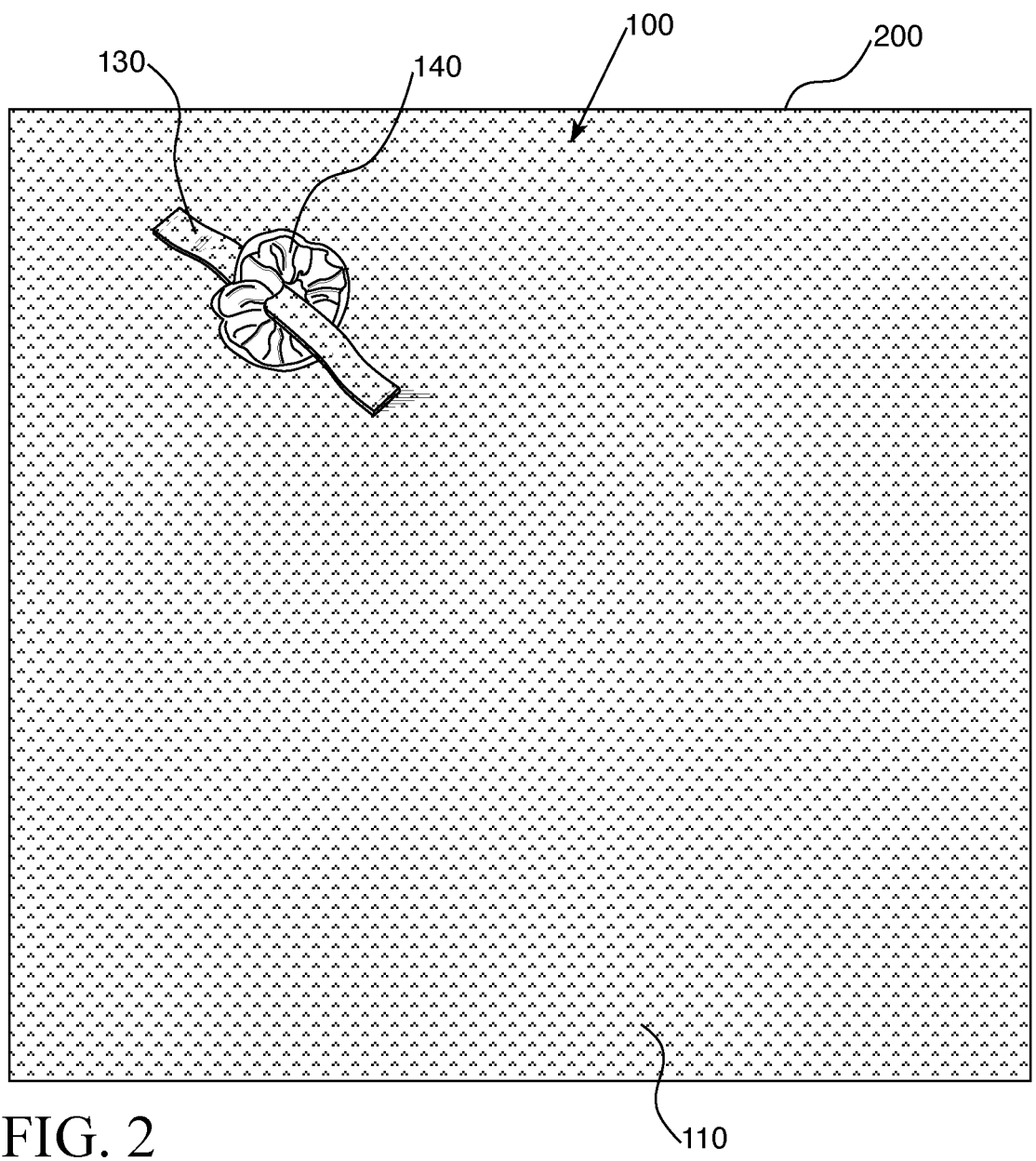
FIG. 2 depicts a plan view showing the fabric sheet of the gift wrap in its open state with the fabric sizing strip and elastic loop attached.

FIG. 2 depicts a plan view showing the fabric sheet of the gift wrap in its flat open state with the fabric sizing strip 130 and elastic loop 140 attached. In the preferred embodiment, the elastic loop 140 is covered in fabric. The fabric sizing strip 130 comprises an elongated member extending towards the peripheral edge 200. The fabric sizing strip 130 passes through the elastic loop 140 whereby the elastic loop 140 is coupled to the first side 110 of the fabric sheet 100. The elastic loop 140 is moveable with respect to the fabric sheet 100 and constrained to the fabric sheet 100 via the fabric sizing strip 130. The fabric sizing strip 130 extends toward the peripheral edge so that the elastic loop 130 can be moved with respect to the fabric sheet 100 to accommodate gifts of varying sizes.

Figure 3:
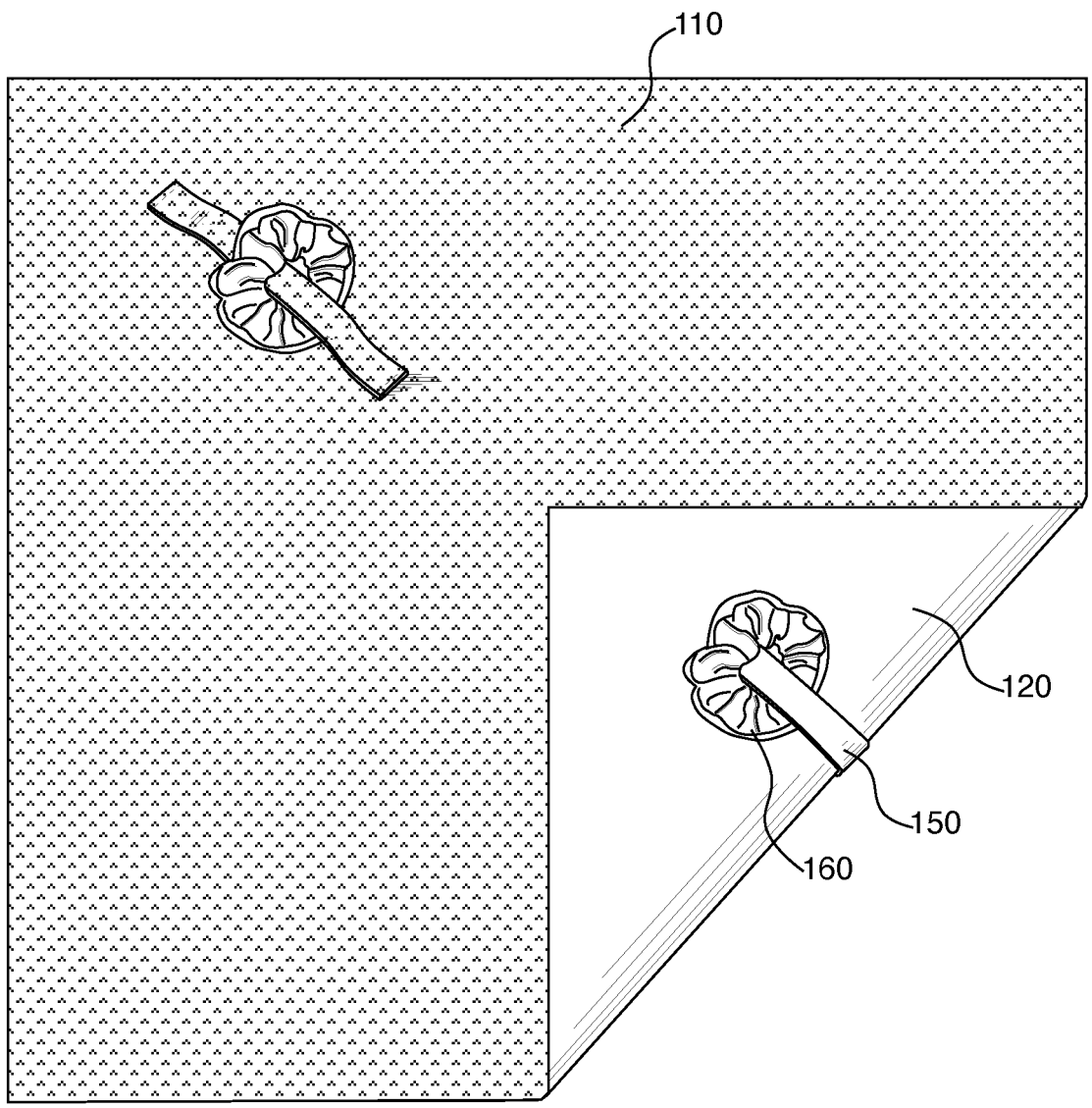
FIG. 3 depicts a plan view showing one corner of the gift wrap folded to depict the elastic loop and fabric sizing strip on the opposite side of the fabric sheet.

In some embodiments, the fabric gift wrap is double sided and reversible. FIG. 3 depicts a plan view showing one corner of the gift wrap folded to expose the second side 120 of the fabric sheet 100. In some embodiments, the second side 120 of the fabric sheet 100 has a second sizing strip 150 and second elastic loop 160 so that the fabric gift wrap is reversible. When the fabric gift warp is reversible, the same fabric gift wrap can be presented in two different aesthetic designs for the purchase of one fabric gift wrap article.

The sides of the reusable fabric sheet may have the same color, design and/or pattern. Alternatively, the sides of the fabric sheet may have different or contrasting colors, designs, and/or patterns. In some embodiments the first side 110 is a first color and the second side 120 is a second color. In other embodiments, the first side 110 is a first pattern and the second side 120 is a second pattern. In other embodiments, the first side 110 comprises a solid color and the second side 120 comprises a pattern. A variety of embellishments may be applied to the fabric sheet such as buttons, bows, charms, ribbons, flowers, seasonal items, for example.

In the preferred embodiment, the color of the fabric sizing strip 130 matches the color of the side of the fabric sheet 100 to which the fabric sizing strip 130 is coupled so that it blends in with the fabric sheet 100 when the gift is wrapped. In other embodiments, the pattern of the fabric sizing 130 strip matches the pattern of the opposite side in order to contrast with the fabric sheet when the gift is wrapped. In other embodiments, the pattern of the fabric sizing strip 130 does not match either side of the fabric sheet 100.

Figure 6:
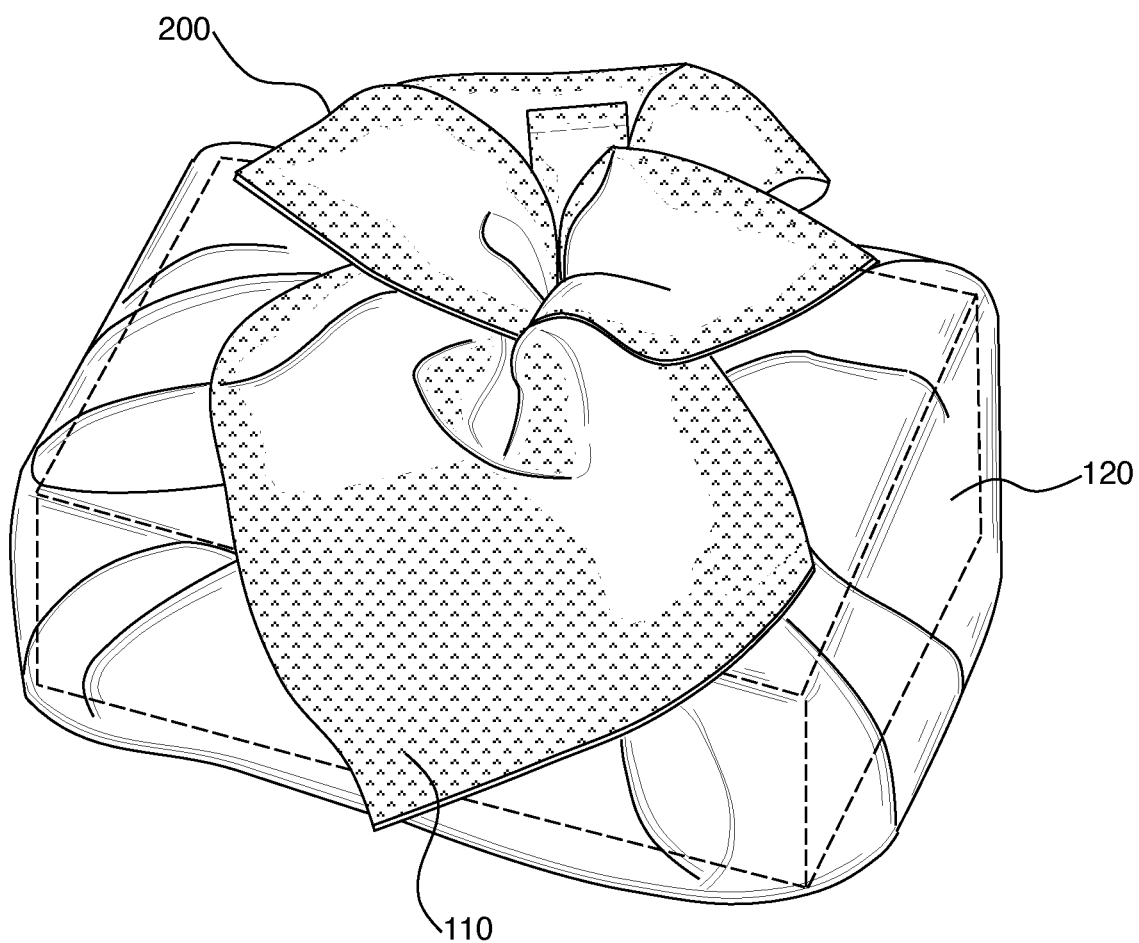
FIG. 6 depicts a perspective view of the gift wrap as completely secured around a rectangularly shaped gift.

In use, the peripheral edge 200 of the fabric sheet 100 is pulled up around the gift and fed through the elastic loop 140 to secure the fabric gift wrap around the gift. The elastic loop 140 is slid down the fabric sizing strip 130 toward the gift until it fits the appropriate size. The peripheral edge 200 is then folded down over the elastic loop 140 to conceal the elastic loop 140. The peripheral edge 200 when folded down can form a pinwheel shaped bow. In some embodiments, the peripheral edge 200 forms a pinwheel shaped bow of equal proportion as shown in FIG. 1. In other embodiments, the peripheral edge 200 forms a pinwheel shaped bow of varying sizes due to an elongated gift as shown in FIG. 6. The size and shape of the pinwheel shaped bow varies with the size and shape of the gift being wrapped.

Figure 4:
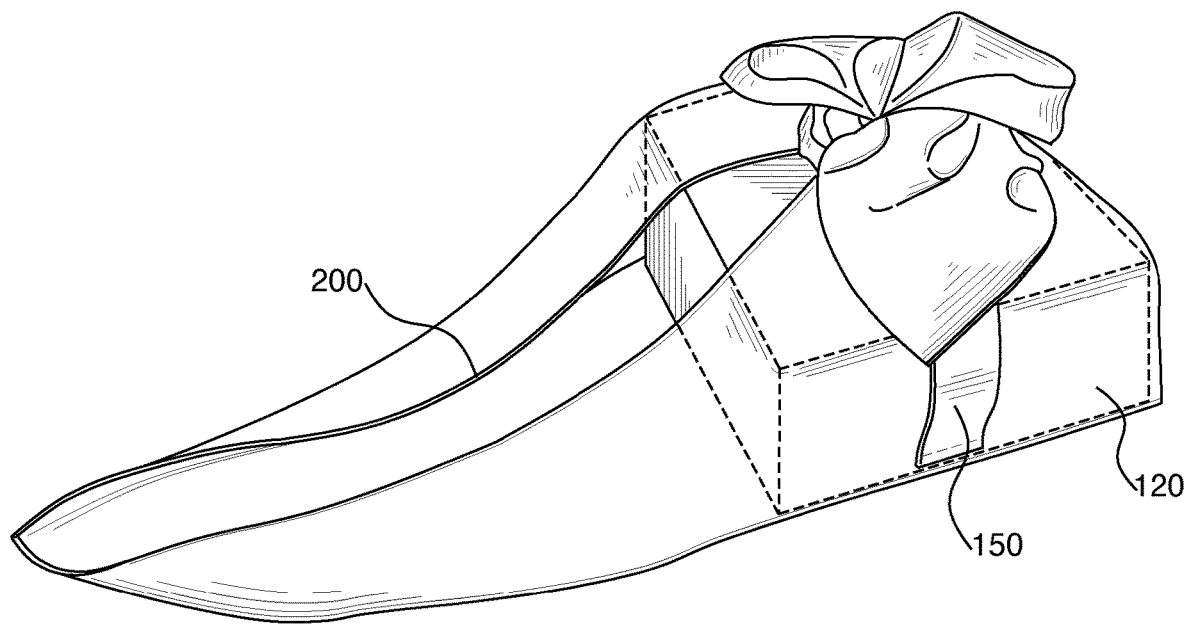
FIG. 4 depicts a perspective view with the gift wrap corners partially folded up around the gift.
Figure 5:
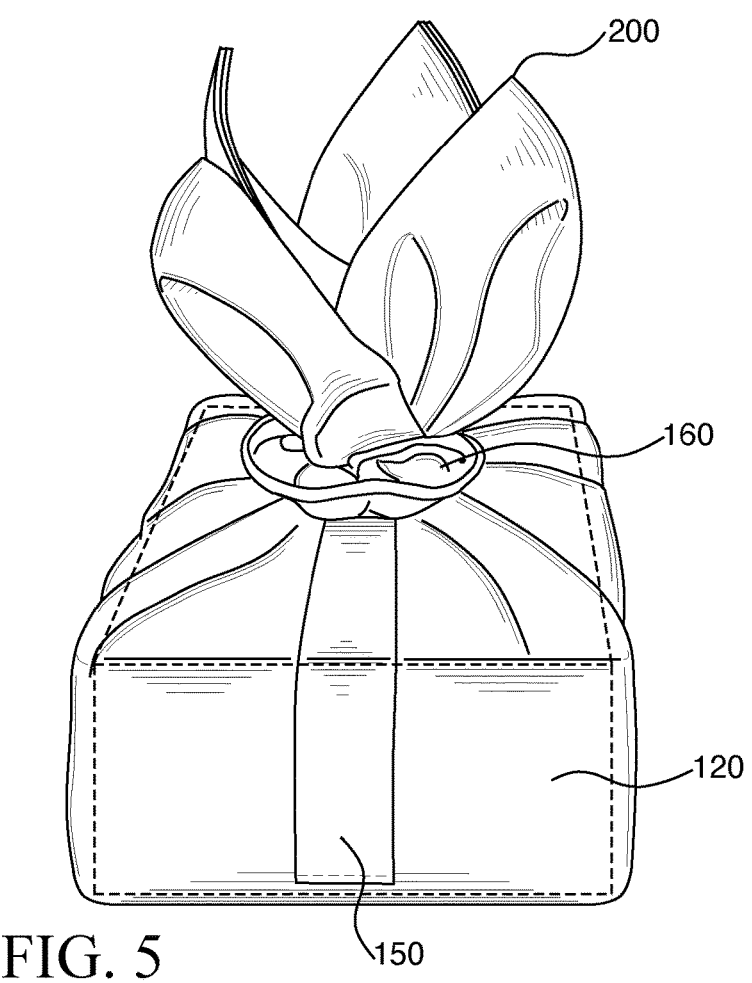
FIG. 5 depicts a perspective view with the elastic loop secured at the base of the corners completely folded up around the gift.

To use the reusable fabric gift wrap, best seen in FIGS. 4-6, the first or second side which will become the outside of the completed giftwrap is placed facing downwardly and the opposite side is placed facing up. A gift to be wrapped is then placed on the exposed side. The peripheral edge 200 of the fabric sheet 100 is then pulled up around the gift to conceal it in its entirety as shown in FIG. 5. The elastic loop 140 is expanded so that the peripheral edge 200 can be completely pulled through the elastic loop 140. The elastic loop 140 is then slid down the fabric sizing strip 130 toward the gift until it reaches the gift and secures the fabric sheet 100 around the exterior of the gift as shown in FIG. 5. The peripheral edge 200 is then folded around the elastic loop 140 toward the gift, forming a pinwheel shaped bow as shown in FIG. 1 and FIG. 6.

The fabric sheets of FIGS. 1-6 are configured to hold and conform to items of various shapes and sizes, such as, for example, a rectangular box, a square box, or any other shaped gift. By way of example, FIG. 6 depicts a perspective view of the reusable fabric gift wrap shown fully assembled on a rectangular shaped box.

The reusable fabric gift wrap forms an aesthetically pleasing gift wrapping for gifts of various sizes and shapes and for many occasions. When not in use, the fabric gift wrap can be stored folded for later reuse. The fabric gift wrap can be washed in a conventional washing machine for continuous reuse.

I claim:

1. A reusable article for wrapping gifts comprising:
a fabric sheet comprising a peripheral edge at a junction of a first side and a second side of the fabric sheet, an elastic loop, and a fabric sizing strip;
wherein the fabric sizing strip comprises an elongated member extending towards the peripheral edge;
the fabric sizing strip is coupled to the first side of the fabric sheet;
the fabric sizing strip passes through the elastic loop whereby the elastic loop is coupled to the first side of the fabric sheet, the elastic loop is moveable with respect to the fabric sheet and constrained to the fabric sheet via the fabric sizing strip.

2. The reusable article of claim 1 wherein the first side of the fabric sheet comprises a first color and the second side of the fabric sheet comprises a second color.

3. The reusable article of claim 1 wherein the first side of the fabric sheet comprises a first pattern and the second side of the fabric sheet comprises a second pattern.

4. The reusable article of claim 1 wherein the first side of the fabric sheet comprises a solid color and the second side of the fabric sheet comprises a pattern.

5. The reusable article of claim 2 wherein the color of the fabric sizing strip matches the color of the side of the fabric sheet to which the fabric sizing strip is coupled.

6. The reusable article of claim 3 wherein the pattern of the fabric sizing strip matches the pattern of the side of the fabric sheet to which the fabric sizing strip is coupled.

7. The reusable article of claim 1 wherein a second fabric sizing strip is coupled to the second side of the fabric sheet.

8. The reusable article of claim 1 wherein the elastic loop comprises a fabric covering.

9. The reusable article of claim 1 where the fabric sheet comprises a quadrilateral.

* * * * *